United States Patent [19]

Gilberts

[11] 4,321,649

[45] * Mar. 23, 1982

[54] SURGE VOLTAGE ARRESTER WITH VENTSAFE FEATURE

[75] Inventor: Alexander G. Gilberts, Algonquin, Ill.

[73] Assignee: Reliable Electric Company, Franklin Park, Ill.

[*] Notice: The portion of the term of this patent subsequent to Jun. 17, 1997, has been disclaimed.

[21] Appl. No.: 54,667

[22] Filed: Jul. 5, 1979

[51] Int. Cl.³ .............................................. H02H 9/06

[52] U.S. Cl. .................................. 361/119; 361/124; 361/129; 337/32; 337/33

[58] Field of Search ............... 361/124, 120, 119, 125, 361/129, 117, 118; 337/15, 17, 18, 31, 32, 33; 313/306, 325

[56] References Cited

U.S. PATENT DOCUMENTS

| | | | |
|---|---|---|---|
| 3,254,179 | 5/1966 | Howard . | |
| 3,254,181 | 5/1966 | Lemieux . | |
| 3,569,786 | 3/1971 | Kunugi . | |
| 3,651,440 | 3/1972 | Bahr et al. . | |
| 3,676,743 | 7/1972 | Bahr et al. | 361/120 |
| 3,755,715 | 8/1973 | Klayum et al. . | |
| 3,979,646 | 9/1976 | Peche et al. | 361/120 |
| 3,989,973 | 11/1976 | Lange et al. | 361/120 X |
| 4,002,952 | 1/1977 | Menninga | 361/120 X |
| 4,062,054 | 12/1977 | Simokat . | |
| 4,084,208 | 4/1978 | Bazarian et al. | 361/120 |
| 4,128,855 | 12/1978 | Gilberts | 361/119 |
| 4,208,694 | 6/1980 | Gilberts | 361/119 |
| 4,212,047 | 7/1980 | Napiorkowski | 361/124 |
| 4,241,374 | 12/1980 | Gilberts | 361/124 |

*Primary Examiner*—Patrick R. Salce

*Attorney, Agent, or Firm*—Trexler, Bushnell & Wolters, Ltd.

[57] ABSTRACT

A surge voltage arrester assembly comprises a primary gas tube surge arrester and an air gap secondary arrester that provides surge protection should the gas tube become vented to atmosphere. The secondary arrester has the air gap defined by a rim of one of the gas tube electrodes and an opposed roughened surface of a metallic cup into which the gas tube is positioned. The roughened cup surface has a coating of graphite applied thereto. The electrode rim may or may not be roughened and/or coated. In a three element version of the invention wherein the gas tube has two line electrodes and a ground electrode, metallic cups are provided at opposite ends of the gas tube to cooperate with the ground electrode for forming secondary air gaps for each line electrode. The cup surfaces at the secondary air gaps are roughened and graphite coated. An O-ring seals each secondary air gap against the entrance of contaminants.

2 Claims, 5 Drawing Figures

FIG. 1
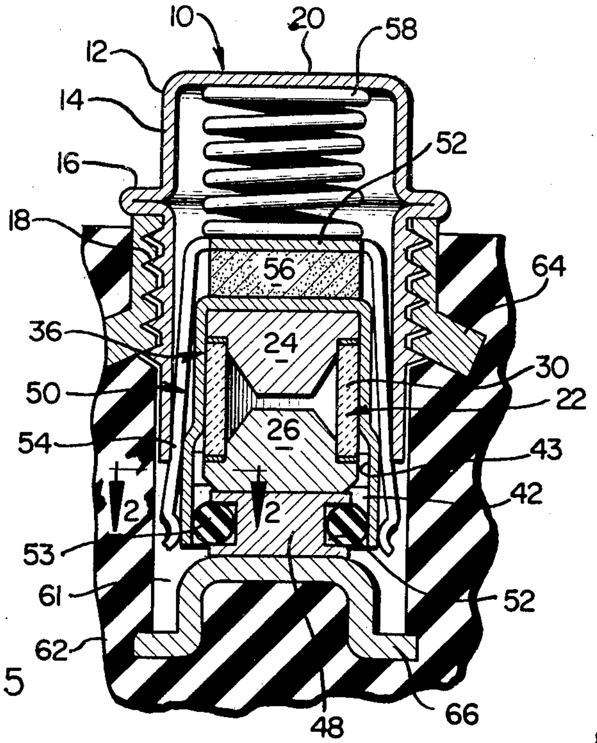
FIG. 2
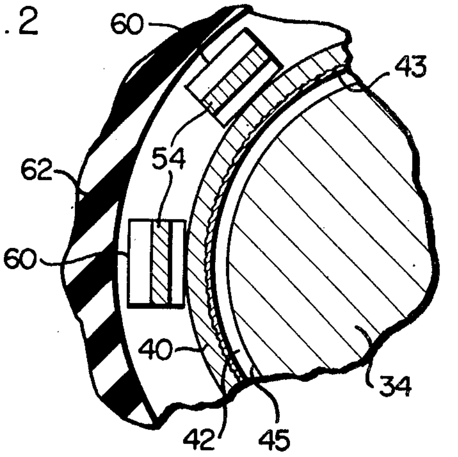
FIG. 4
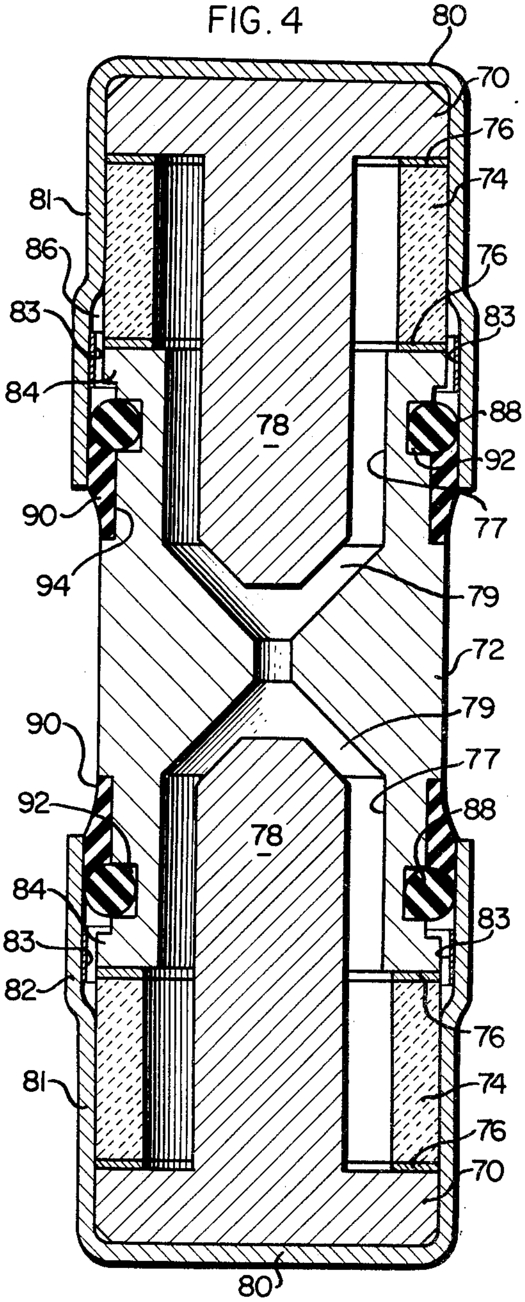
FIG. 5
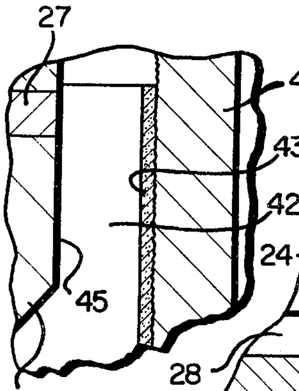
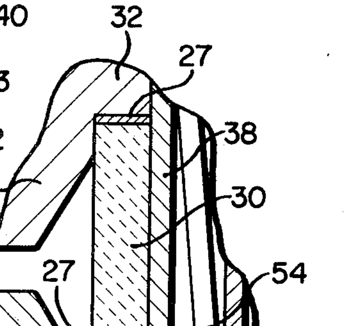
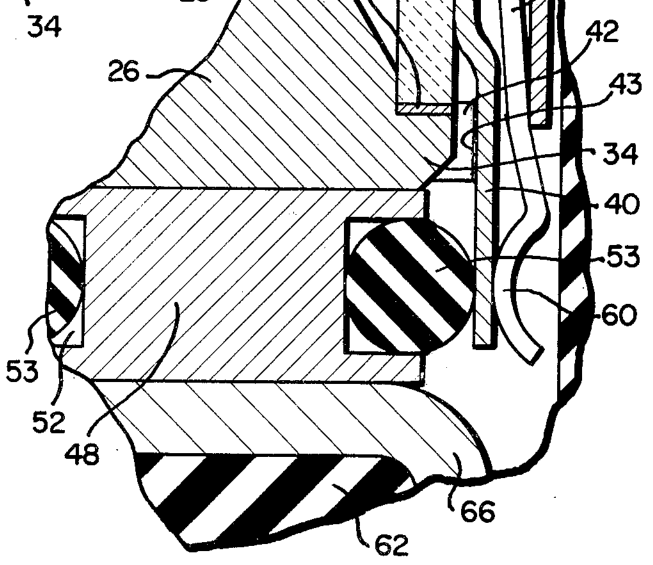
FIG. 3

SURGE VOLTAGE ARRESTER WITH VENTSAFE FEATURE

BACKGROUND OF THE INVENTION

This invention relates to improvements surge voltage arresters for line protectors of the type used for protecting telephone lines and like communication lines from over-voltage and over-current conditions.

Surge voltage arrester of the cold cathode gas discharge tube type serve as the primary arrester and source of protection in various line protectors of the station or central office type. Such line protectors may also include a carbon or other type of air gap back-up protector in the event of a failure of the primary surge arrester as a result of leakage of gas from the tube due to a broken seal or similar damage. A gas tube arrester which has failed in this manner will be difficult to detect because the line to which it is connected continues to operate properly. Thus, it is desirable to provide some type of air gap or secondary surge arrester as a "back-up" or ventsafe feature in the event of failure of the gas tube arrester. Line protectors embodying these surge voltage arresters are frequently installed under conditions wherein dust, moisture and other contaminants can enter the secondary air gap. This can alter the breakdown voltage characteristics of the air gap.

In providing secondary or back-up protection of the air gap type the ideal situation is to construct the air gap with a breakdown surge voltage that is slightly above the breakdown surge voltage of the gas tube arrester. In this way the secondary air gap is not utilized so long as the gas tube is functioning properly. However, the idealized situation is not attainable on a mass production basis. Thus, there is always a range over which the gas tube breaks down, and this will depend upon many factors, including production tolerances as well as the number of times the gas tube has fired. Likewise, as far as the air gap is concerned, production tolerances, electrode surface conditions, and other factors will result in a variation of breakdown voltages from unit to unit.

Where the air gap is made quite small in order to provide a low breakdown voltage, there is the possibility that the breakdown voltage of the air gap may in some cases be below that of the gas tube, in which event the air gap would break down while the gas tube is still functioning properly. Moreover, in a typical arrangement in which the electrodes of the air gap are of metal, the air gap will short out after one or a few discharges, leaving a surge arrester unit that has short-circuited the line but which nevertheless has a properly functioning gas tube. On the other hand, if the air gap is made large in an attempt to prevent short circuitry, its breakdown voltage may be so high that it exceeds the specifications or requirement of the user. Therefore, in surge arresters having facing metal surfaces that define the secondary arc gap a compromise has been attempted so as to provide an arc gap which is small enough to break down at a low enough voltage for useful purposes, but which breakdown voltage is nevertheless above the breakdown voltage of the gas tube.

SUMMARY OF THE INVENTION

An object of this invention is to provide an improved surge voltage arrester assembly that utilizes a gas tube as a primary surge arrester and an air gap or secondary surge arrester in the event of failure of the gas tube arrester due to leakage or from other causes. The assembly may be of the type having either a two electrode or a three electrode gas tube and in each case the air gap has facing metal electrode surfaces, one of which is roughened and coated with graphite or the like.

In accordance with the foregoing objects, the surge voltage arrester assembly, whether of the two or three electrode type, has a primary surge arrester of the cold cathode gas tube type and a secondary arrester of the air gap type. The breakdown voltage of the secondary arrester is greater than the breakdown voltage of the primary arrester. The arresters are adapted to be connected to form parallel electric circuits from a line to be protected to ground. The secondary arrester has the air gap defined by an annular portion of a metallic cup that contains the gas tube and also by the rim of an electrode that forms part of the gas tube. The annular cup portion of the cup at the air gap is sand blasted to provide a roughened surface to which graphite or a like voltage breakdown-enhancing substance is applied. The air gap is annular in configuration. Means including an annular ring are provided for sealing the gas tube in the cup so as to prevent contaminants from entering the air gap.

BRIEF DESCRIPTION OF THE DRAWINGS

FIG. 1 is a sectional view of a surge voltage arrester assembly of the present invention and shown embodied in a known type of line protector;

FIG. 2 is a fragmentary sectional view on an enlarged scale taken along line 2—2 of FIG. 1;

FIG. 3 is an enlarged fragmentary portion of FIG. 1;

FIG. 4 illustrates a three element gas tube form of the invention and with the section line taken along the longitudinal axis of the tube; and FIG. 5 is an enlarged fragmentary portion of FIG. 3.

DETAILED DESCRIPTION

Referring now to the drawing there is shown a station protector 10 embodying a surge voltage arrester assembly of the invention. The protector comprises a sheet metal housing or cap 12 having an annular sidewall portion 14 containing an annular flange or stop-shoulder 16. Below the shoulder 16, the sidewall 14 is formed with a screw thread 18 for threading into the well 61 of a protector block 62, as will be presently more fully described. The cap 12 also includes an end wall 20 which is opposite to the open end of the cap 12.

Mounted within the cap 12 are several coaxial parts which provide the primary and secondary surge arrester assembly of the invention. More specifically, there is a gas tube 22 having opposed electrodes 24, 26 that define an arc gap 28 therebetween. The electrodes 24, 26 are separated by a tubular insulator 30 of ceramic or the like to which the electrodes 24, 26 are brazed or soldered in the usual manner. Thus, the electrodes respectively have annular electrode flanges 32, 34 at which the electrodes 24, 26 are silver soldered to the ends of the insulator 30 by rings 27.

The gas tube 22 is coaxially housed within a tubular structure that is in the form of a metallic cup 36 having a cylindrical sidewall 38. The gas tube 22 fits closely within the confines of the cup 36 although the gas tube and parts assembled therewith may slide relative to the cup so as to facilitate assembly of those parts.

Near the open end of the cup 36 the sidewall 38 has diametrally enlarged annular cylindrical skirt or end portion 40 which surrounds the peripheral edge surface 45 of the electrode flange 34. This end portion 40 defines the open end of the cup 36 and is radially spaced from the surface 45 of the electrode flange 34, thereby defining a secondary air gap 42 of annular configuration. This arrangement provides a secondary or back-up surge arrester.

Prior to assembly of the parts of the protector 10, the end portion 40 is roughened on its inner cylindrical surface at least in the region that will be presented to the air gap 42 when the parts are assembled. This roughening may be done by sandblasting. A coating of carbonacious material such as graphite 43 is then applied to the roughened area which makes adherence of the graphite to the metal possible. The graphite may be applied as an annular band by rubbing a pencil or other graphite-containing tool against the roughened surface and then blowing off the excess with air. The graphite band 43 is thus opposite to the peripheral surface 45 of the electrode flange 34 and generally coextensive therewith. The surface 45 may or may not be sandblasted and coated with graphite.

It is within the scope of this invention to apply other voltage breakdown enhancing materials as the band 43. Also, the graphite might possibly be applied as a suspension that is painted on the end portion 40. In any event the effect of the graphite 43 is to permit a wider gap 42 for the same breakdown voltage than would be possible in the absence of the graphite.

The end of the electrode flange 34 has a metal contact 48 thereagainst with an annular groove 52 for receiving an annular O-ring 53. The O-ring 53 is of pliable material, preferably an elastomer, for example silicone rubber, although other elastomers might also be suitable. The O-ring is of a diameter such that it seals against the inside surface of the end portion 40 near its lower end.

The metallic cup 36 is coaxially housed within a metallic grounding cage 50 having an end wall 52 and a plurality of circumferentially spaced, spring-like fingers 54. The spring fingers are compressed radially inwardly when the cup 36, together with the arrester assembly, are inserted as a unit within the open end of the cap sidewall 14. In this regard a solder pellet 56 is inserted into the cage 50 prior to insertion of the assembled cup and gas tube so that the solder pellet lies between the end wall of the cup 36 and the end wall 52 of the cage 50. A coil compression spring 58 bears at one end on the end wall 20 and at its opposite end against the flat end wall 52 of the grounding cage. During assembly of the protector, the sealing ring 53 and the contact 48 prevent the gas tube 22 from coming out of the cup 36.

The protector 10 is adapted to be mounted in the well 61 of the dielectric block or receptacle 62. This block, which is of known construction, has a metallic contact member 64 with an internal thread as shown for receiving the cap thread 18. This contact member 64 is usually connected to ground. At the bottom of the well 61 is a metallic contact 66 which is electrically connected to the electrode 26 through the metal contact 48. Contact 66 is connected to the line to be protected. In threading the protector 10 into the ground contact member 64 to the limit of the stop-shoulder 16, the extreme end surface of the contact 48 will firmly engage the line contact 66 by reason of the force of the spring 58.

The arc gaps 28 and 42 are electrically coupled in parallel circuits from the line contact 66 to the ground contact 64. The width of the arc gap 42 is such that its breakdown voltage is greater than that of the breakdown voltage across the arc gap 28 of the gas tube 22. Consequently, when the gas tube arrester is operating properly as a primary surge arrester an over-voltage on the line to be protected will result in a discharge across the gas tube arc gap 28 to ground. The secondary surge arrester will not discharge across the air gap 42. However, if the gas tube should fail due to leakage, some protection will be afforded by a discharge to ground across the air gap 42 even though the breakdown voltage thereacross is somewhat higher than the breakdown voltage across the gas tube when the latter is functioning normally. Because of the widened gap 42 with the graphite surfaced electrode, there is less likelihood of the arc gap 42 shorting out prematurely.

In an overcurrent condition on the line due, for example, to a prolonged voltage at the arcing voltage of the gas tube, the heat within the protector 10 will cause the solder pellet 56 to melt whereupon the force of the spring 58 will press the tips 60 of the grounding cage into direct metallic contact with the line contact 66. This results in a direct metallic connection of the line to be protected from the line contact 66 to the ground contact member 64.

A three element gas tube version of the arrester assembly is shown in FIG. 4. The primary or gas tube surge arrester comprises opposed line electrodes 70, 70 and a center or ground electrode 72. The several electrodes are insulated from each other by ceramic insulators 74, 74 which are soldered by rings 76 to the respective electrodes. The center or ground electrode 72 is hollow to provide communicating coaxial cavities 77, 77 that receive stem portions 78, 78 of the line electrodes 70, 70. The stem portions 78, 78 cooperate with the ground electrode to provide primary arc gaps 79, 79 from each line electrode to ground.

A secondary air gap 86 is also provided between each line electrode 70 and the ground electrode 72. A metallic cup 80, similar to cup 36, receives and contacts a line electrode such that the open ends of the cups 80, 80 face each other. Each cup has a cylindrical sidewall 81 with a diametrally enlarged annular cylindrical end portion 82 that is spaced from a rim 84 of the ground electrode 72 to provide the annular secondary air gap 86. Each cup 80 is sandblasted and has a band of graphite 83 applied thereto in the region of the gap 86.

The sealing arrangement for each air gap 86 also utilizes a pliable elastomeric annular O-ring 88 and may also use a sealing compound 90. The O-ring fits into an annular groove 92 in the ground electrode and is sized to engage the end portion 82. The sealing compound 90 if used is disposed in a second annular groove 94 in the ground electrode 72 and seals against that electrode as well as against the O-ring 88 and the end portion 82.

The cups 80, 80 may be sized to fit into a clip type receptacle for respective connections to the two sides of the telephone line to be protected. The center electrode may receive a clip or other connector in the region between the two O-rings or the bands of sealing compound 90, 90. Other conventional mountings for the gas tube may be made as it is essentially cylindrical in configuration and so lends itself to ready adaption to known mountings.

As in FIGS. 1-3, the primary arc gaps 79, 79 have breakdown voltages less than that of the secondary air gaps 86, 86 except when the gas tube becomes vented, in which case the air gaps have the lower breakdown voltage. As a result "ventsafe" protection is provided for each side of the protected line.

This invention is claimed as follows:

1. A surge voltage arrester assembly having a primary surge arrester of the cold cathode gas tube type and a secondary surge arrester of the air gap type, the breakdown voltage of the secondary arrester being greater than the breakdown voltage of the primary arrester, said arresters being housed together and being adapted to be connected to form parallel electric circuits from a line to be protected to ground, said secondary arrester having its air gap defined by a surface of an annular portion of a metallic cup that contains said gas tube and a surface of a rim of an electrode that forms part of said gas tube, said air gap being annular in configuration, means sealing said gas tube in said cup, said sealing means including an annular pliable ring and a contact engaging said electrode and projecting through said ring; said contact being spaced from said annular portion, means forming an annular groove receiving said pliable ring, said pliable ring spanning the space between said contact and said annular portion, and at least one of said surfaces having a coating of material that enhances the surge breakdown voltage of the air gap at the coating so that for a given surge breakdown voltage of the air gap, the air gap is wider than would be the case in the absence of such coating.

2. A surge voltage arrester according to claim 1 in which said gas tube is of a three-electrode type, a first of said electrodes being a ground electrode and the second and third of said electrodes forming primary arc gaps with said first electrode, and said contact being a part of said first electrode.

* * * * *